United States Patent
Park et al.

(10) Patent No.: US 10,007,154 B2
(45) Date of Patent: Jun. 26, 2018

(54) LIQUID CRYSTAL DISPLAY DEVICE

(71) Applicant: LG DISPLAY CO., LTD., Seoul (KR)

(72) Inventors: Jeonghwan Park, Chilgok-gun (KR); Hun Jeoung, Paju-si (KR); Sukho Cho, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 10 days.

(21) Appl. No.: 15/140,134

(22) Filed: Apr. 27, 2016

(65) Prior Publication Data

US 2016/0320653 A1    Nov. 3, 2016

(30) Foreign Application Priority Data

Apr. 30, 2015  (KR) .......................... 10-2015-0061170

(51) Int. Cl.
  *G02F 1/1333*    (2006.01)
  *G02F 1/1335*    (2006.01)
  *G02F 1/1339*    (2006.01)

(52) U.S. Cl.
  CPC .... *G02F 1/13394* (2013.01); *G02F 1/133512* (2013.01); *G02F 1/133553* (2013.01); *G02F 2001/13398* (2013.01); *G02F 2001/133357* (2013.01)

(58) Field of Classification Search
  USPC .................................................. 349/155, 156
  See application file for complete search history.

(56) References Cited

U.S. PATENT DOCUMENTS

| | | | |
|---|---|---|---|
| 6,424,402 B1* | 7/2002 | Kishimoto | G02F 1/133514 349/106 |
| 2004/0183989 A1* | 9/2004 | Kim | G02F 1/13394 349/155 |
| 2005/0140858 A1* | 6/2005 | Park | G02F 1/13394 349/110 |

* cited by examiner

*Primary Examiner* — Wen-Ying P Chen
(74) *Attorney, Agent, or Firm* — Dentons US LLP (57) ABSTRACT

Provided is a display device. The display device includes: a TFT array substrate; a column spacer on the TFT array substrate; and a non-light transmissive material layer under the column spacer, the non-light transmissive material layer being in contact with a lower surface of the column spacer and formed of a non-light transmissive material having a different refractive index from the column spacer.

14 Claims, 5 Drawing Sheets

LIQUID CRYSTAL DISPLAY DEVICE

This application claims priority of Korean Patent Application No. 10-2015-0061170 filed on Apr. 30, 2015, in the Korean Intellectual Property Office, the disclosure of which is incorporated herein by reference for all purposes as if fully set forth herein.

BACKGROUND

Field

The present disclosure relates to a liquid crystal display device and a method of manufacturing the same. More particularly, the present disclosure relates to a liquid crystal display device having a column spacer structure.

Discussion of the Related Art

A liquid crystal display (LCD) device has a high contrast ratio and low power consumption and is suitable for displaying a moving image. Therefore, it has been applied to various fields such as laptop computers, monitors, and TVs. Liquid crystals have a thin and long liquid crystal molecule. Further, liquid crystals exhibit optical anisotropy with directionality in alignment and polarization by which alignment of the liquid crystals may change depending on the intensity of an electric field when the liquid crystals are within the electric field. Thus, the LCD device implements an image using the optical anisotropy and polarization of liquid crystals.

Generally, the LCD device includes a liquid crystal panel manufactured by bonding two facing substrates and a liquid crystal layer is interposed between the two facing substrates. Electrodes are formed on inner surfaces of the two substrates. An electric field applied to the electrodes causes a change in alignment of liquid crystal molecules and thus causes a difference in light transmissivity.

Due to the difference in light transmissivity of the liquid crystal panel, a light supplied from a backlight unit placed on a back surface of the liquid crystal panel is allowed to pass. A color combination implemented by the light supplied from the backlight unit when passing through a color filter is displayed as a color image.

Generally, a LCD device manufacturing process can be divided into a substrate manufacturing process, a cell process, and a module process. The substrate manufacturing process is a process for separately manufacturing an array substrate and a color filter substrate. The cell process is a process for completing a liquid crystal panel. Further, the module process is a process for integrating the liquid crystal panel and a backlight unit.

To be specific, in the substrate manufacturing process, thin film deposition, photo-lithography, etching, etc. are repeated many times to implement a thin film transistor (TFT) array layer and a color filter layer on each substrate. In the cell process, a seal pattern for bonding is formed on any one of the TFT array substrate and the color filter substrate and the two substrates are bonded facing each other with a liquid crystal layer interposed therebetween to complete a liquid crystal panel. In the module process, the completed liquid crystal panel is bonded to a polarizing plate, a driving circuit, etc. and then integrated with a backlight unit to complete a LCD device.

Meanwhile, a spacer is positioned between the TFT array substrate and the color filter substrate to maintain a constant gap therebetween. The spacer can be classified into a ball spacer and a column spacer depending on a shape and a placement method thereof. The ball spacers are scattered on the array substrate or the color filter substrate, and the column spacer is formed on the array substrate or the color filter substrate by patterning. Recently, the column spacer which can be formed into a desired shape at a specific location has been widely used.

SUMMARY

Accordingly, the present disclosure is directed to a display device and a method of manufacturing the same that substantially obviate one or more problems due to limitations and disadvantages of the related art.

An advantage of the present disclosure is to provide a column spacer and a liquid crystal display device using the column spacer. To be more specific, an advantage of the present disclosure is to provide a column spacer structure which includes a material that does not transmit a light on a lower surface and thus can ensure the accuracy of height measurement using the light. Further, another advantage of the present disclosure is to provide a liquid crystal display device manufactured by using the column spacer having the special structure.

According to an embodiment of the present disclosure, there is provided a liquid crystal display device. The liquid crystal display device comprises: a thin-film transistor (TFT) array substrate; a column spacer on the TFT array substrate; and a non-light transmissive material layer under the column spacer, the non-light transmissive material layer being in contact with a lower surface of the column spacer and formed of a non-light transmissive material having a different refractive index from the column spacer.

According to another embodiment of the present disclosure, there is provided a liquid crystal display device. The liquid crystal display device comprises: a pair of substrates; and a column spacer array positioned on one of the pair of substrates. All column spacers in the column spacer array are configured to maintain a gap between the pair of substrates. At least some column spacers in the column spacer array may include upper end surfaces and lower end surfaces with different refractive indices.

According to another embodiment of the present disclosure, there is provided a display device. The display device comprises: a pair of substrates; and a cell-gap maintaining structure having a first portion and a second portion which are made of materials different from each other. The second portion is configured to allow a height measurement of the first portion.

According to exemplary embodiments of the present disclosure, the special structure is employed at a lower end portion of a column spacer, which allows for measuring a height of the column spacer accurately. Accordingly, the accuracy of a liquid crystal display device manufacturing process can be improved and a defect ratio of products can be reduced. Further, by applying the above-described column spacer and manufacturing process, a quality variation of a liquid crystal display device according to the exemplary embodiments can be reduced.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the present disclosure and are incorporated in and constitute a part of this specification, illustrate embodiments of the present disclosure and together with the description serve to explain the principles of the invention. In the drawings.

DETAILED DESCRIPTION OF THE ILLUSTRATED EMBODIMENTS

In describing components of the present disclosure, terms such as first, second, A, B, (a), and (b), can be used. These terms are used only to differentiate the components from other components. Therefore, the nature, order, sequence, and the like, of the corresponding components are not limited by these terms. It is to be understood that when one element is referred to as being "connected to" or "coupled to" another element, it may be connected directly to or coupled directly to another element or be connected to or coupled to another element, having still another element "intervening" therebetween, or "connecting" or "coupling" them. When an element or layer is referred to as being "on" another element or layer, intervening elements or layers may be present. Since size and thickness of each component illustrated in the drawings are represented for convenience in explanation, the present disclosure is not necessarily limited to the illustrated size and thickness of each component.

The features of various embodiments of the present disclosure can be partially or entirely bonded to or combined with each other and can be interlocked and operated by a person having ordinary skill in the art in technically various ways, and the embodiments can be carried out independently of or in association with each other.

Hereinafter, various exemplary embodiments of the present disclosure will be described in detail with reference to the accompanying drawings.

Figure 1:
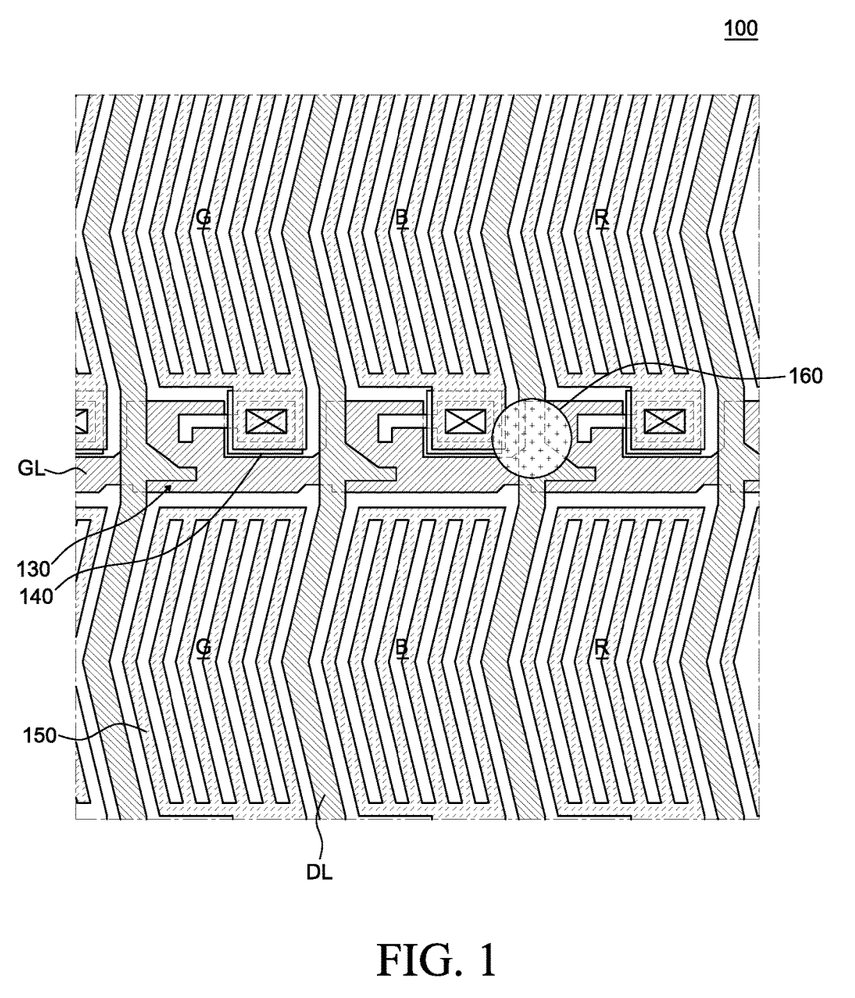
FIG. 1 is a schematic plan view of a liquid crystal display device according to an exemplary embodiment of the present disclosure.
Figure 2:
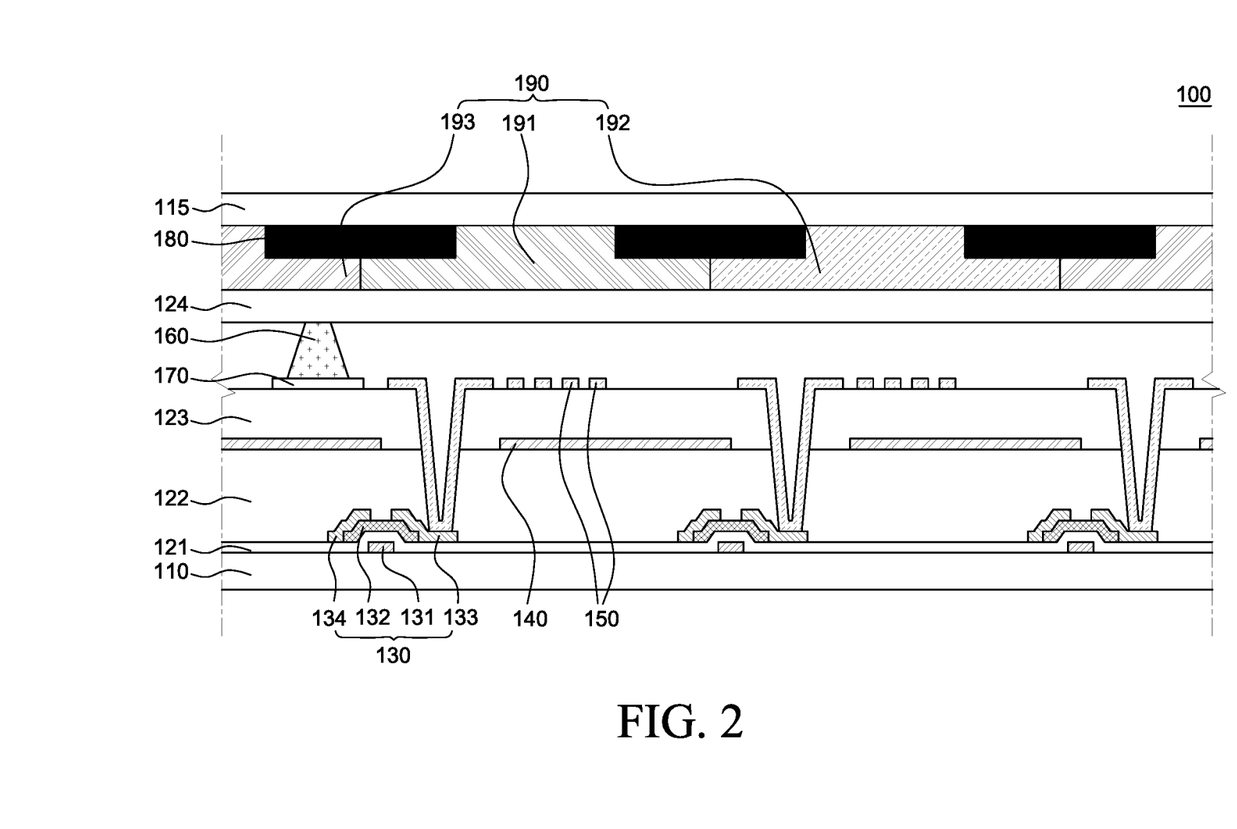
FIG. 2 is a schematic cross-sectional view of a liquid crystal display device according to an exemplary embodiment of the present disclosure.

FIG. 1 is a schematic plan view of a liquid crystal display device according to an exemplary embodiment of the present disclosure. FIG. 2 is a schematic cross-sectional view of a liquid crystal display device according to an exemplary embodiment of the present disclosure.

Referring to FIG. 1 and FIG. 2, a liquid crystal display (LCD) device 100 includes a first substrate (TFT array substrate) 110, a second substrate (color filter substrate) 115, a thin film transistor (TFT) 130, planarization layers 122 and 123, a common electrode 140, a pixel electrode 150, a column spacer 160, a non-light transmissive material layer 170, a black matrix 180, and the like. FIG. 1 illustrates only some of the elements of the LCD device 100 for convenience in explanation.

The first substrate 110 is an array substrate of the LCD device 100, and includes a plurality of pixels and pixel driving elements (a transistor, a capacitor, and the like). The plurality of pixels may be defined by gate lines GL and data lines DL intersecting with each other. In the LCD device 100, N number of gate lines GL and M number of data lines DL intersect with each other and N×M number of pixels are present. However, FIG. 1 illustrates only two red pixels R, two green pixels G and two blue pixels B for convenience in explanation. Referring to FIG. 1, the plurality of pixels is defined as the green pixel G, the blue pixel B, and the red pixel R in sequence on a plane.

The TFT 130 is formed on the first substrate 110. The TFT 130 is disposed corresponding to each of the pixels R, G, and B. Each TFT 130 includes a gate electrode 131, an active layer 132, a source electrode 133 and a drain electrode 134. To be specific, the gate electrode 131 electrically connected to the gate line GL is formed on the first substrate 110, and a gate insulation layer 121 is formed on the gate electrode 131. The active layer 132 including a channel is formed on the gate insulation layer 121. Further, the drain electrode 134 electrically connected to the data line DL and the source electrode 133 electrically connected to the pixel electrode 150 are formed on the active layer 132. The active layer 132 may be formed of amorphous silicon, polycrystalline silicon, oxide semiconductor, and the like.

A first planarization layer 122 is formed to cover the TFT 130 on the first substrate 110. The first planarization layer 122 flattens an upper portion of the first substrate 110 on which the TFT 130 is formed. The first planarization layer 122 may be formed of an organic insulation material, such as photo acryl, having a low dielectric constant. An additional passivation layer may be further formed on the TFT 130 and the first planarization layer 122 may be formed on the passivation layer.

The common electrode 140 is formed on the first planarization layer 122. The common electrode 140 is an electrode for driving a liquid crystal layer. The common electrode 140 is formed into a single pattern in a region except a region where a contact hole for electrically connecting the pixel electrode 150 to the source electrode 133 of the TFT 130 is formed. The common electrode 140 may be electrically connected to a common line disposed in parallel to the gate line GL through a separate contact hole.

A second planarization layer 123 is formed on the common electrode 140. The second planarization layer 123 protects the common electrode 140 and also flattens an upper portion of the common electrode 140. The second planarization layer 123 may be formed of the same material as the first planarization layer 122, or may be formed of a different insulation material from the first planarization layer 122.

The pixel electrode 150 is formed on the second planarization layer 123. The pixel electrode 150 is an electrode for driving the liquid crystal layer. The pixel electrode 150 is formed into a box shape in each pixel and includes a plurality of slits on the second planarization layer 123. The pixel electrode 150 is electrically connected to the source electrode 133 of the TFT 130 through a contact hole formed in the first planarization layer 122 and the second planarization layer 123. The pixel electrode 150 may have a shape bent at least once at a central portion as illustrated in FIG. 1. The pixel electrode 150 and the common electrode 140 may be formed of a transparent conductive material.

FIG. 1 illustrates that the pixel electrode 150 is formed into a box shape and includes a plurality of slits and the common electrode 140 is formed into a single pattern. However, the common electrode 140 may include a plurality of slits instead of the pixel electrode 150, and the pixel electrode 150 and the common electrode 140 may be formed on the same layer.

The second substrate 115 is a color filter substrate of the LCD device 100 and faces the first substrate 110. The black matrix 180 that defines the plurality of pixels as light blocking regions and open regions is formed on the second substrate 115. That is, a region where the black matrix 180 is formed is defined as a light blocking region and a region where the black matrix 180 is not formed is defined as an open region. In a region corresponding to the light blocking region, various driving elements and lines such as the TFT 130, the data lines DL, and the gate lines GL are formed. In a region defined as the open region, the pixel electrode 150 and the common electrode 140 are formed.

A plurality of color filters 190 is formed on the second substrate 115 on which the black matrix 180 is formed. To be specific, a red color filter 191, a green color filter 192, and a blue color filter 193 are formed so as to correspond to the open regions of the red pixel R, the green pixel G, and the blue pixel B, respectively. A part of each of the red color filter 191, the green color filter 192 and the blue color filter 193 may be overlapped with the black matrix 180.

An overcoating layer 124 is formed on the second substrate 115 so as to cover the black matrix 180, the red color filter 191, the green color filter 192, and the blue color filter 193. The overcoating layer 124 is a layer for flattening a lower portion of the second substrate 115 on which the black matrix 180, the red color filter 191, the green color filter 192, and the blue color filter 193 are formed. The overcoating layer 124 is formed of an insulation material. The overcoating layer 124 may be formed of the same material as the first planarization layer 122.

The column spacer 160 is formed between the first substrate 110 and the second substrate 115. The column spacer 160 can maintain a cell gap of the LCD device 100. The column spacer 160 is formed on a light blocking region where the black matrix 180 is formed.

The column spacer 160 may be disposed corresponding to a light blocking region between the blue pixel B and the red pixel R as illustrated in FIG. 2. That is, the column spacer 160 may be formed to be overlapped with the data line DL formed on the light blocking region between the blue pixel B and the red pixel R and overlapped with the black matrix 180.

Figure 4A:
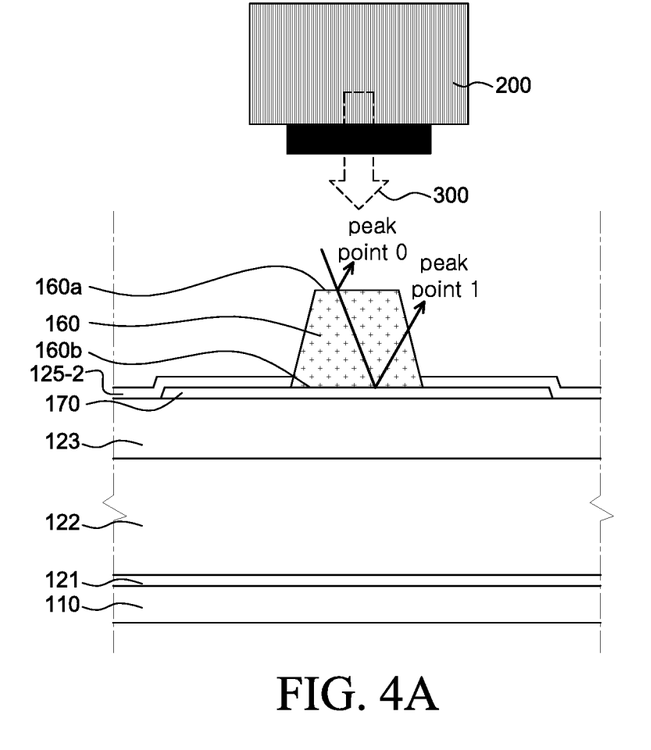
FIG. 4A and FIG. 4B are conceptual diagrams of measurement of a height of a column spacer according to an exemplary embodiment of the present disclosure.

The non-light transmissive material layer 170 may be formed between a lower surface of the column spacer 160 and an upper surface of the second planarization layer 123. The non-light transmissive material does not allow an external light to be substantially incident into the non-light transmissive material. That is, most of external lights are reflected on a surface of the non-light transmissive material layer 170. Further, the non-light transmissive material layer 170 may be formed of a material having a different refractive index from the column spacer 160. That is, the non-light transmissive material layer 170 and the column spacer 160 may be different mediums. Therefore, a light emitted from a specific external device facing the column spacer 160 may be incident into an upper surface of the column spacer 160 (surface closest to the second substrate). In this case, a part of the light is reflected on the upper surface and the rest is incident into the column spacer 160. Further, the light incident into the column spacer 160 is reflected on the lower surface of the column spacer 160 (surface farthest from the second substrate) without penetrating the non-light transmissive material layer 170. That is, the light emitted from the external device toward the column spacer is reflected on two parts (the upper surface of the column spacer and an upper surface of the non-light transmissive material layer 170). By using this property, a height of the column spacer 160 can be measured. The measurement of the height of the column spacer 160 will be described in more detail with reference to FIG. 4.

The non-light transmissive material layer 170 may be formed of a metal material, the same material as the black matrix 180, and the like. Herein, the non-light transmissive material layer 170 may have a thickness sufficient to reflect the incident light at a predetermined ratio or more. For example, a height of the non-light transmissive material layer 170 may be variously determined depending on properties of the material, and may be, for example, about 2300 Å.

The non-light transmissive material layer 170 and the column spacer 160 are formed to be in contact with each other. Referring to FIG. 2, the non-light transmissive material layer 170 and the column spacer 160 may be disposed such that the upper surface of the non-light transmissive material layer 170 and the lower surface of the column spacer 160 are in contact with each other.

FIG. 1 and FIG. 2 illustrate that the column spacer 160 is positioned between the red pixel R and the blue pixel B, but the present disclosure is not limited thereto. The column spacer 160 may be formed between the red pixel R and the green pixel G or between the green pixel G and the blue pixel B.

A first alignment film may be formed on the second planarization layer 123 of the first substrate 110 and a second alignment film may be formed on the overcoating layer 124 of the second substrate 115. The first alignment film and the second alignment film may be formed of polyimide (PI).

The liquid crystal layer is interposed between the first substrate 110 and the second substrate 115. The liquid crystal layer may be interposed between the second planarization layer 123 of the first substrate 110 and the overcoating layer 124 of the second substrate 115. To be specific, the liquid crystal layer may be interposed between the first alignment film and the second alignment film.

A backlight unit for supplying a light to the liquid crystal layer of the LCD device 100 may be further included in the LCD device 100.

FIG. 1 and FIG. 2 illustrate that the column spacer 160 is formed on a side of the first substrate 110. However, the column spacer 160 may be formed on a side of the second substrate 115. Further, the column spacer 160 and a structure (for example: non-light transmissive material layer) for measuring a height of the column spacer 160 may be formed outside the display panel, i.e., on a mother substrate (mother glass). That is, in order to check the accuracy of an LCD device manufacturing process, they may be formed at any location where a height of the column spacer needs to be measured.

Figure 3:
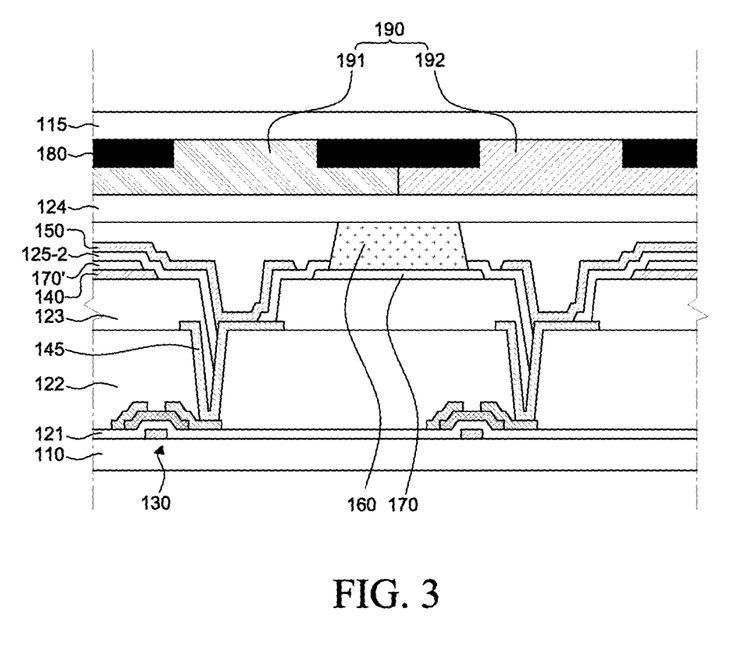
FIG. 3 is a schematic cross-sectional view of a liquid crystal display device according to another exemplary embodiment of the present disclosure.

FIG. 3 is a schematic cross-sectional view of a liquid crystal display (LCD) device according to another exemplary embodiment of the present disclosure.

The LCD device illustrated in FIG. 3 is substantially the same as the LCD device in FIG. 2 except that the common electrode 140 and the pixel electrode 150 are disposed on the second planarization layer 123 and the pixel electrode 150 is connected to the TFT 130 by a connection conductor 145.

Further, the LCD device illustrated in FIG. 3 may further include a resistance-reducing conductor 170' on the common electrode 140. The structure 170 (for example, non-light transmissive material layer) under the column spacer 160 may be formed while the conductor 170' is manufactured. In this case, a process for adding the structure 170 under the column spacer 160 may be more simplified. Meanwhile, in order to suppress corrosion of the structure 170, an insulation layer 125-2 on the second planarization layer 123 may cover a lateral surface and an upper surface of the structure 170.

Meanwhile, the non-light transmissive material layer 170 may be a part included in the column spacer 160. That is, the column spacer including a lower end surface formed as a non-light transmissive material layer for reflecting a light emitted from an external measurement device and incident into an upper end surface of the column spacer to the external measurement device may be manufactured first. Then, the column spacer may be positioned between two substrates.

Figure 4B:
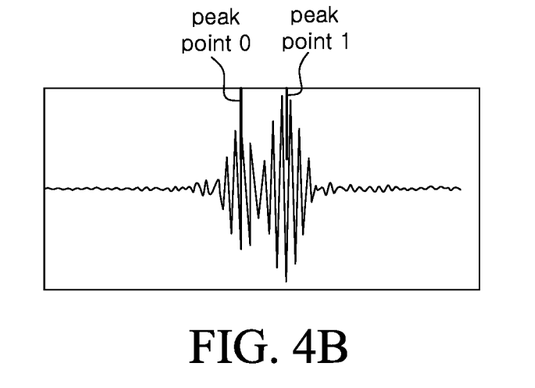

FIG. 4A and FIG. 4B are conceptual diagrams of measurement of a height of a column spacer according to an exemplary embodiment of the present disclosure.

During the LCD device manufacturing process, it may be necessary to measure a height of the column spacer 160 after the column spacer 160 is manufactured. It is important for the LCD device that a height of the liquid crystal layer is uniformly maintained throughout the LCD device. The uniformity in a height of the liquid crystal layer, i.e., a cell gap, is directly related to a display quality. Thus, it is necessary to check whether or not the column spacers for maintaining the cell gap have a uniform height.

In this process, a device 200 for measuring a height of the column spacer may be used. An example of the external measurement device 200 is an interferometer. The external measurement device 200 irradiates a light to a measurement target object and measures a height using interference of reflected and returned lights. The interferometer for example is a device configured to cause interference and analyze a thus generated interference pattern. An interference pattern analysis method can be classified into the following two methods.

Firstly, the so-called Phase Shift Interferometry (PSI) is a method in which an interference pattern is generated using a monochromatic wavelength with a long provisional interference distance and then a height is measured according to a specific math formula. That is, it is a method for measuring a height by analyzing a movement distance of one phase.

Secondly, the so-called White Light Scanning Interferometry (WSI) is a method for measuring a height using a white light with a short provisional interference distance. An interference pattern is generated using a white light with a short provisional interference distance. Then, the interference pattern is moved by scanning a target object using a piezoelectric element moving in nanometer (nm) unit. Then, a change in intensity from the highest portion of the measurement target object is observed with alternation of black and white. The change in intensity is analyzed using a specific algorithm to measure a height. This method is referred to as WSI. Since white light interference has a short provisional interference distance, if a certain object is scanned with a predetermined amount, interference occurs first from the highest portion. If a change in intensity is observed from a high portion of the object, a variation of intensity is checked to distinguish where is high and where is low.

When a height of the column spacer 160 is measured by WSI, if a change in intensity is observed using light interference, peak points are formed respectively corresponding to portions 160*a* and 160*b* where a medium is changed, as illustrated in FIG. 4B. A gap between the peak points can be converted into a distance, and, thus, a height can be calculated. Since a medium is changed at the upper surface 160*a* and the lower surface 160*b* of the column spacer, two peak points 0 and 1 may appear. In this case, if a very thin or transparent material is positioned under the lower surface 160*b*, the second peak point (peak point 1) may not clearly appear. In particular, if a transparent organic thin film serving as a passivation layer is positioned under the column spacer, when a height is measured with the interferometer, the interferometer may not distinguish the passivation layer and the column spacer.

Accordingly, if the non-light transmissive material layer is disposed under the column spacer in order to easily recognize the lower surface 160*b* of the column spacer, the lower surface 160*b* can be clearly recognized. If the non-light transmissive material layer is disposed under the column spacer, peak points can be clearly distinguished as illustrated in FIG. 4B.

Figure 5A:
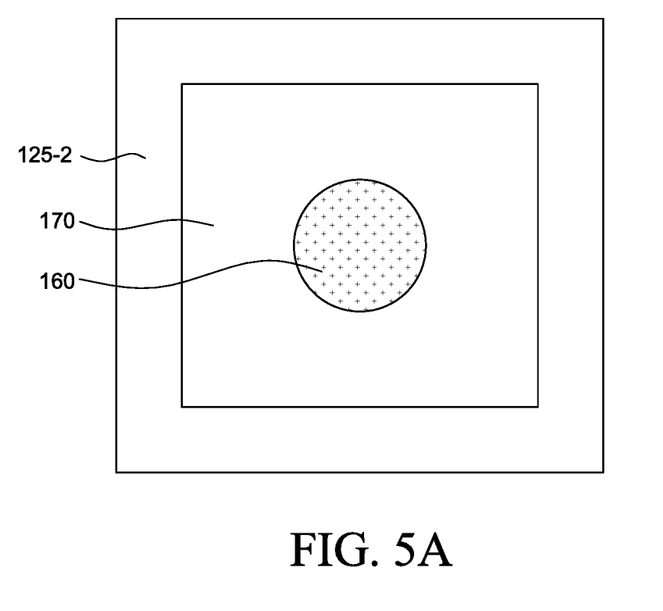
FIG. 5A and FIG. 5B are a plan view and a cross-sectional view illustrating the surroundings of a column spacer according to an exemplary embodiment of the present disclosure.
Figure 5B:
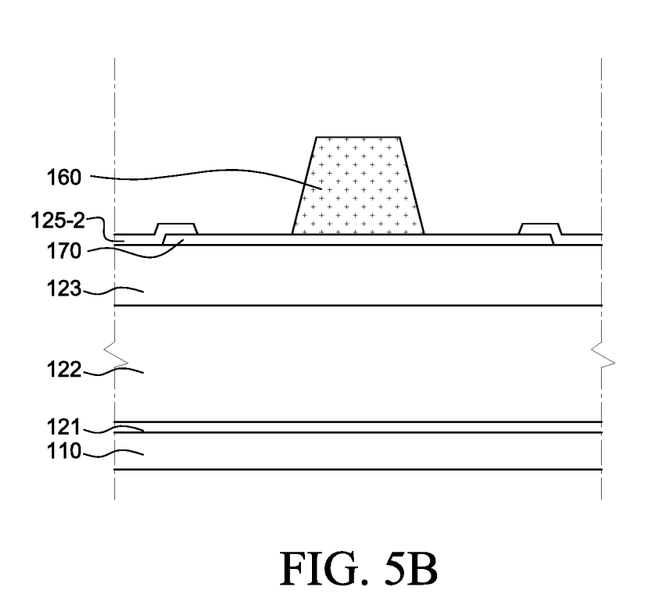

FIG. 5A and FIG. 5B are a plan view and a cross-sectional view illustrating the surroundings of a column spacer according to an exemplary embodiment of the present disclosure.

FIG. 5A is a plan view when a column spacer is seen from a direction of an upper substrate. Referring to FIG. 5A, the column spacer 160, the non-light transmissive material layer 170 under the column spacer 160, and the insulation layer 125-2 around the non-light transmissive material layer 170 can be seen. The non-light transmissive material layer 170 is in contact with the lower surface of the column spacer 160, and may be formed of metal, carbon black, or the like that does not transmit light.

The non-light transmissive material layer 170 may be disposed so as to correspond to the entire lower end surface of the column spacer 160. Otherwise, the non-light transmissive material layer 170 may be disposed wider than the entire lower end surface of the column spacer 160 for convenience in process. That is, the non-light transmissive material layer 170 may be disposed to have an equal or greater area than the lower end surface of the column spacer 160 at a location corresponding to the lower end surface of the column spacer 160.

The insulation layer 125-2 is deposed to cover a part or whole of the non-light transmissive material layer 170. FIG. 5A and FIG. 5B illustrate that the insulation layer 125-2 covers a part of the non-light transmissive material layer 170. FIG. 3 and FIG. 4 illustrate that the insulation layer 125-2 may cover the lateral surface and the upper surface of the structure 170. However, the insulation layer 125-2 may be disposed to be separated from the structure 170 with a predetermined distance without covering the lateral surface and the upper surface of the structure 170. The insulation layer 125-2 may be positioned on the same layer as the non-light transmissive material layer 170.

The exemplary embodiments of the present disclosure can also be described as follows:

A liquid crystal display device according to an exemplary embodiment of the present disclosure may comprise: a thin-film transistor (TFT) array substrate; a column spacer on the TFT array substrate; and a non-light transmissive material layer under the column spacer, being in contact with a lower surface of the column spacer, and formed of a non-light transmissive material having a different refractive index from the column spacer.

The non-light transmissive material layer may be configured to reflect light incident into the column spacer from a direction facing an upper surface of the column spacer.

The non-light transmissive material layer may have a thickness sufficient to reflect the incident light at a predetermined ratio or more.

The non-light transmissive material layer may be formed of a metal material.

The liquid crystal display device may further include an insulation layer positioned on the same layer as the non-light transmissive material layer and covering a part of the non-light transmissive material layer.

The non-light transmissive material layer may be on a planarization layer, and the planarization layer may act to flatten the upper portions of TFTs disposed on the TFT array substrate.

The liquid crystal display device may further include a color filter substrate on which a black matrix is disposed at a location corresponding to the column spacer. The non-light transmissive material layer may be formed of the same material as the black matrix.

A liquid crystal display device according to another exemplary embodiment of the present disclosure may include: a pair of substrates; and a column spacer array positioned on one of the pair of substrates. All column spacers in the column spacer array are configured to maintain a gap between the pair of substrates. At least some column spacers in the column spacer array may include upper end surfaces and lower end surfaces with different refractive indexes so as to measure heights thereof.

The at least some column spacers may be in contact with a non-light transmissive material layer such that the lower end surfaces thereof reflect a light emitted from an external measurement device and incident into the upper end surfaces of the column spacers to the external measurement device.

The at least some column spacers may be configured to be a non-light transmissive material layer such that the lower end surfaces thereof reflect a light emitted from an external measurement device and incident into the upper end surfaces of the column spacers to the external measurement device.

The column spacer array may be positioned on a substrate where a pixel and elements for driving the pixel are disposed among the pair of substrates.

A liquid crystal display device according to another exemplary embodiment of the present disclosure may comprise: a pair of substrates; and a cell-gap maintaining structure having a first portion and a second portion which are made of materials different from each other, wherein the second portion is configured to allow height measurement of the first portion.

The first portion may have a different refractive index from the second portion.

The first portion may be a spacer that maintains a gap between the pair of substrates, and the second portion may consist of a material that reflects light which arrives at the second portion through the first portion.

The second portion may be formed of a non-light transmissive material.

The second portion may be formed of metal or carbon black.

The second portion may improve recognition of a boundary between the first portion and the second portion by an interferometer.

The cell-gap maintaining structure may have a third portion covering at least a part of the second portion.

The cell-gap maintaining structure may be at a light blocking region between a blue pixel and a red pixel.

The cell-gap maintaining structure may be overlapped with a data line and a black matrix on the light blocking region.

The foregoing description and the accompanying drawings are provided only to illustrate the technical conception of the present disclosure, but it will be understood by a person having ordinary skill in the art that various modifications and changes such as combinations, separations, substitutions, and alterations of the components may be made without departing from the scope of the present disclosure.

What is claimed is:

1. A liquid crystal display device comprising:
a thin-film transistor (TFT) array substrate;
a column spacer on the TFT array substrate;
a non-light transmissive material layer under the column spacer, the non-light transmissive material layer being in contact with a lower surface of the column spacer and formed of a non-light transmissive material having a different refractive index from the column spacer; and
an insulation layer positioned on the same layer as the non-light transmissive material layer and covering a part of the non-light transmissive material layer,
wherein the non-light transmissive material layer is configured to reflect a light incident into the column spacer from a direction facing an upper surface of the column spacer.

2. The liquid crystal display device of claim 1, wherein the non-light transmissive material layer has a thickness sufficient to reflect the incident light at a predetermined ratio or more.

3. The liquid crystal display device of claim 1, wherein the non-light transmissive material layer is formed of a metal material.

4. A liquid crystal display device comprising:
a thin-film transistor (TFT) array substrate;
a column spacer on the TFT array substrate;
a non-light transmissive material layer under the column spacer, the non-light transmissive material layer being in contact with a lower surface of the column spacer and formed of a non-light transmissive material having a different refractive index from the column spacer; and
an insulation layer positioned on the same layer as the non-light transmissive material layer and covering a part of the non-light transmissive material layer,
wherein the non-light transmissive material layer is on a planarization layer and the planarization layer acts to flatten the upper portions of TFTs disposed on the TFT array substrate.

5. A liquid crystal display device comprising:
a thin-film transistor (TFT) array substrate;
a column spacer on the TFT array substrate;
a non-light transmissive material layer under the column spacer, the non-light transmissive material layer being in contact with a lower surface of the column spacer and formed of a non-light transmissive material having a different refractive index from the column spacer; and
a color filter substrate on which a black matrix is disposed at a location corresponding to the column spacer,
wherein the non-light transmissive material layer is formed of the same material as the black matrix.

6. A display device comprising:
a pair of substrates; and
a cell-gap maintaining structure having a first portion and a second portion which are made of materials different from each other,
wherein the second portion is configured to allow a height measurement of the first portion, wherein the cell-gap maintaining structure is at a light blocking region and is overlapped with a black matrix on the light blocking region, wherein the first portion of the cell-gap maintaining structure is on the second portion of the cell-gap maintaining structure, and the second portion of the cell-gap maintaining structure is disposed wider than the entire lower end surface of the first portion of the cell-gap maintaining structure.

7. The display device of claim 6, wherein the first portion has a different refractive index from the second portion.

8. The display device of claim 6, wherein the first portion is a spacer that maintains a gap between the pair of substrates, and the second portion consists of a material that reflects light which arrives at the second portion through the first portion.

9. The display device of claim 8, wherein the second portion is formed of a non-light transmissive material.

10. The display device of claim 9, wherein the second portion is formed of metal or carbon black.

11. The display device of claim 8, wherein the second portion improves recognition of a boundary between the first portion and the second portion by an interferometer.

12. The display device of claim 6, wherein the light blocking region is between adjacent pixels.

13. The display device of claim 12, wherein the cell-gap maintaining structure is overlapped with a data line on the light blocking region.

14. A display device comprising:
a pair of substrates; and
a cell-gap maintaining structure having a first portion and a second portion which are made of materials different from each other,
wherein the second portion is configured to allow a height measurement of the first portion,
wherein the cell-gap maintaining structure is at a light blocking region and is overlapped with a black matrix on the light blocking region,
wherein the cell-gap maintaining structure has a third portion covering at least a part of the second portion.

* * * * *